Nov. 28, 1961  H. C. McCULLOUGH  3,010,191
STATOR COIL STRIPPING MACHINE
Filed Jan. 2, 1959

INVENTOR.
HENRY C. McCULLOUGH
BY
ATTORNEY

United States Patent Office 3,010,191
Patented Nov. 28, 1961

3,010,191
STATOR COIL STRIPPING MACHINE
Henry C. McCullough, Bermuda Road,
Stone Mountain, Ga.
Filed Jan. 2, 1959, Ser. No. 784,725
3 Claims. (Cl. 29—205)

This invention relates to a stator coil stripping machine, and more particularly concerns a machine for clamping the stator casing of an electric motor so as to permit the stator coil windings to be pulled therefrom.

In the repair of electric motors of the induction type, it is often necessary to remove the stator coils or field windings from the motor casing or frame. Machines including a clamping and stripping mechanism have been devised to facilitate this operation, but such machines have failed to gain wide acceptance in the industry due to inherent objectionable characteristics. For example, such machines have required the tedious, individual tensioning of clamps to secure the motor casing to a table surface, and have the further disadvantage in that stator casings with outwardly extending flanges must be "blocked up" so as to permit the motor casing to be disposed in level relation with the table surface prior to clamping. Such machines have further been deficient in that the clamping arrangement utilized therein was such as to present the top of the stator coils at a different position vertically with respect to the pulling mechanism for stators of different axial length, with the result that the pulling or stripping mechanism also had to be vertically adjusted.

One of the objects of this invention, therefore, is to overcome these and other problems known to the prior art by the provision of a new and improved stator coil stripping machine which incorporates a highly effective and efficient mechanism for securing motor stator casings of different diameters and axial lengths.

Another object of this invention is to provide a new and improved stator coil stripping machine which includes a clamping mechanism that secures the motor stator casing at the same spacing from the pulling or stripping apparatus regardless of the axial length of the motor stator casing.

A further object of the present invention is to provide a new and improved stator coil stripping machine which may be used with a wide variety of motor casings including those having mounting flanges extending beyond the length of casing.

Still another object of this invention is to provide in a stator coil stripping machine a new and improved securing arrangement in which the spider which lifts the motor casing also guides the motor casing clamping arms.

A still further object of this invention is to provide a new and improved stator coil stripping machine which is simple yet rugged in construction and well adapted to meet the demands of economic manufacture.

Other objects, features and advantages of this invention will become apparent from consideration of the following specification taken in conjunction with the accompanying drawings wherein like designators refer to the same or similar parts throughout the several views, and in which.

Figure 1:
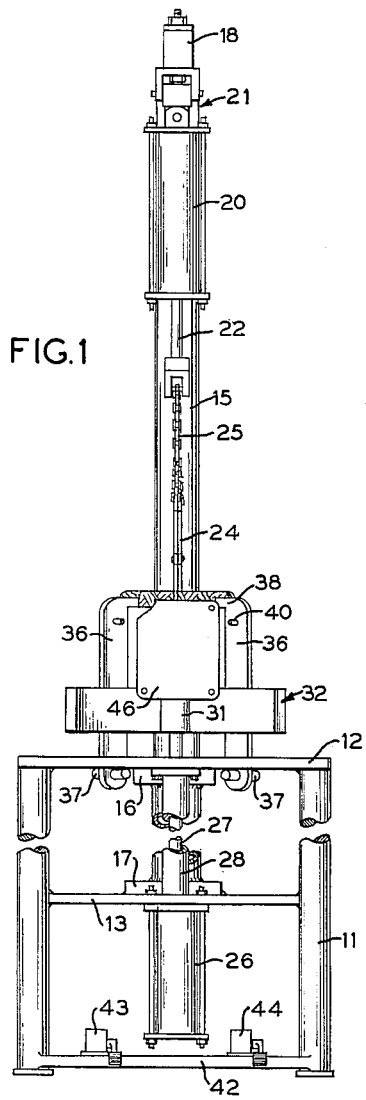
FIG. 1 is a front elevation showing one preferred form of stator coil stripping machine according to my invention.
Figure 2:
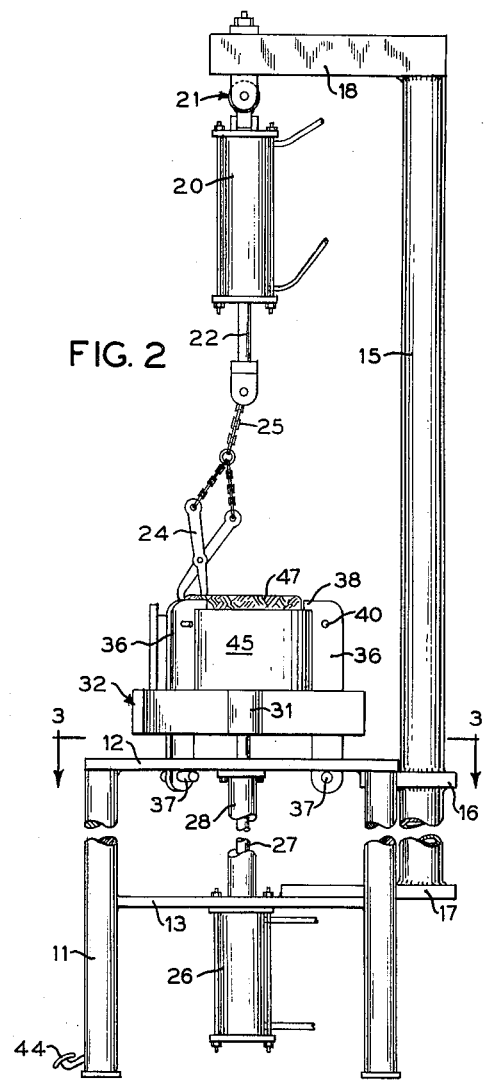
FIG. 2 is a side elevation of the stator coil stripping machine of FIG. 1.

Referring now more particularly to the drawings, that form of the invention herein shown by way of illustration has a base frame of generally rectangular outline including corner posts 11 retained in upright position by a transverse, rectangular table 12 and a crossplate 13 of similar configuration spaced therebelow. Extending upwardly from the rear of the base frame is the column 15 which is secured to the table 12 and crossplate 13 by the brackets 16 and 17, respectively. At its upper end, column 15 supports a forwardly extending over-hang beam 18 from which depends a pneumatic air cylinder 20 by way of a universal hinge coupler 21. Secured centrally above table 12 to the plunger 22 of air cylinder 20 are the conventional tongs 24 which are provided with hooked bottom portions for engaging the field coil windings of the motor stator, the securing arrangement of the plunger to the tongs including an adjustable chain 25, as is well understood by those skilled in the art.

Figure 3:
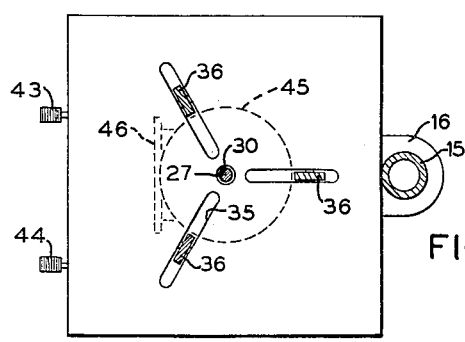
FIG. 3 is a horizontal cross section taken along the line 3—3 of FIG. 2.
Figure 4:
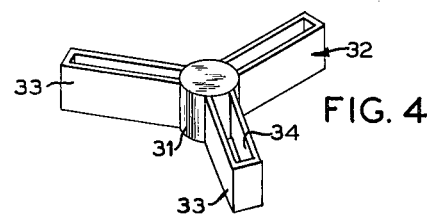
FIG. 4 is a detail in perspective showing the spider for lifting the motor casing.

Referring now more particularly to the motor casing or frame clamping arrangement of my invention, it can be seen that a lower pneumatic cylinder 26 is bolted or otherwise suitably secured to the underside of crossplate 13. Plunger 27 of cylinder 26 extends through crossplate 13, passing upwardly through the guide sleeve 28 which is welded or otherwise suitably secured between table 12 and crossplate 13. Table 12 is provided with a central aperture 30 in communication with the interior of guide sleeve 28 to receive therethrough the plunger 27 for securement thereabove in the hub 31 of support member or spider 32. As shown most clearly in FIG. 3, the spider 32 has equally spaced legs, as at 33, extending radially therefrom, each leg being provided with a longitudinal slot 34. Each spider slot 34 is adapted for registration with one of the three radial slots 35 in table 12 so as to freely receive therethrough a clamping arm 36, the latter being provided with a transverse pin 37 below the table so as to limit upward movement of the clamping arm by abutment of the pin with the underside of the table. The upper end of each clamping arm is formed with an inwardly extending finger 38 which is adapted to hook or engage over the upper end of a motor casing. Above spider 32, a transverse pin 40 is provided in each clamping arm 36 so as to prevent the arm from dropping through the spider and table slots when released from the motor casing. Actuation of the air cylinder is effected in conventional manner, with crossbeam 42 being welded between the forward base posts 11 for securement thereto of pedal valves 43 and 44 for conveniently operating air cylinders 20 and 26, respectively.

In considering the operation of the stator coil stripping machine of my invention, it can be seen that the motor casing or stator frame 45 is first placed on the three-way slotted spider 32. Each clamping arm 36 may then be moved upwardly and inwardly until the fingers 38 extend above and over the casing with the inner side of each clamping arm abutting the outer casing wall. It will be recognized that this arrangement is such as to provide for motor frames or casings of a wide variety of diameters and axial lengths.

Actuation of lower air cylinder 26 then lifts spider 32 upwardly, carrying with it the motor casing 45 which, in turn, carries each clamping arm 36 upwardly, such movement being limited by crosspin 37 in the lower end of each clamping arm abutting the underside of slotted table 12. This operation is such that table slots 35 and spider slots 34 function as guides so as to maintain the clamping arms 36 in radial alignment with motor casing 45 and normal to table 12. It will also be noted that the position of the top of the casing is always brought to the same level above the table independently of the axial length of the motor stator, making it unnecessary to readjust the chain 25 for different stators. This structure also permits level clamping of the motor casing even though it may have an enlarged mounting flange, as at 46, the arrangement being such that the casing flange can nest between adjacent legs of spider 32.

After the motor casing has been clamped in raised position between spider 32 and fingers 38 of clamping arms 36, tongs 24 may then be hooked onto the stator field coils 47, after which actuation of upper air cylinder 20, by depression of pedal valve 44, pulls the field coil from the casing. Upon completion of the stripping operation, deactuation of lower cylinder 26 drops spider 32 back to the table, permitting each clamping arm 36 to be moved radially outwardly and drop downwardly until each pin 40 of a clamping arm 36 abuts the top of its associated spider arm 33, so as to free the motor casing for subsequent repairing operations.

From the foregoing it will be apparent that I have provided a new and improved stator coil stripping machine which is well adapted to fulfill the aforestated objects of the invention. Moreover, whereas the invention has been described with respect to an embodiment that gives satisfactory results, it will be understood by those skilled in the art to which this invention most nearly appertains that modifications and variations thereof may be resorted to without departing from the spirit or scope of the invention as defined by the appended claims.

I claim:

1. In a machine for stripping a stator coil from a motor casing, a base frame, a table on said base frame, said table having a plurality of radial slots, a support member on said table, said support member having a plurality of radial slots, each of said table slots being adapted for registration with one of said support member slots, means for moving said support member vertically, said support member being adapted to carry a motor casing thereon, a plurality of clamping arms each extending through one of said table and support member slots in registration and adapted to engage the motor casing upon upward movement of said support member, means under said table on the lower end of each of said clamping arms for limiting upward movement thereof, and means for removing said stator coil from said motor casing.

2. In a machine for stripping a stator coil from a motor casing, a base frame, a table on said base frame, said table having a plurality of radial slots, a pneumatic cylinder secured to said frame under said table, a cylinder plunger passing upwardly from said cylinder through said table, a spider secured to said plunger above said table, said spider being formed with closed radial slots, each of said spider radial slots being adapted for registration with one of said radial slots, a plurality of clamping arms each passing through one of said registering spider slots and table slots, a plurality of pins each transversely secured in one of said clamping arms below said table for limiting upward movement of said clamping arms, each of said clamping arms being formed with an inwardly radial finger at the upper end thereof, the arrangement being such that upon placing a motor casing on said spider and moving said clamping arms inwardly so that said fingers engage over the top of said casing, subsequent actuation of said pneumatic cylinder will cause said spider to lift the motor casing upwardly until each of said pins abuts the underside of said table so as to prevent further upward movement of said clamping arms thereby securing said motor casing between said clamping arm fingers and said spider, and means for removing said stator coil from said motor casing.

3. In a machine for stripping a stator coil from a motor casing, a base frame, a table on said base frame, said table having a plurality of radial slots, a first pneumatic cylinder secured to said base frame under said table, a cylinder plunger passing upwardly from said cylinder through said table, a spider secured to said plunger above said table, said spider being formed with radial slots, each of said spider radial slots being adapted for registration with one of said table radial slots, a plurality of clamping arms each passing through one of said registering spider slots and table slots, a plurality of pins each transversely secured in one of said clamping arms below said table for limiting upward movement of said clamping arms, each of said clamping arms being formed with an inwardly radial finger at the upper end thereof, the arrangement being such that upon placing a motor casing on said spider and moving said clamping arms inwardly so that said fingers engage over the top of said casing, subsequent actuation of said first pneumatic cylinder will cause said spider to lift the motor casing upwardly until each of said pins abuts the underside of said table so as to prevent further upward movement of said clamping arms thereby securing said motor casing between said clamping arm fingers and said spider, a support extending upwardly from said base frame, a second pneumatic cylinder, means to hingedly secure said second cylinder to said support centrally above said table, means vertically movable by said second cylinder for engaging the stator coil of a motor casing so as to remove such stator coil from the motor casing upon actuation of said second cylinder, and a plurality of crosspins each secured in one of said clamping arms above said spider for limiting downward movement of each of said clamping arms after release from the motor casing.

References Cited in the file of this patent

UNITED STATES PATENTS

| | | |
|---|---|---|
| 2,161,227 | Houston | June 6, 1939 |
| 2,468,970 | Gilbertson | May 3, 1949 |
| 2,723,443 | McKidden | Nov. 15, 1955 |